Figure 1:
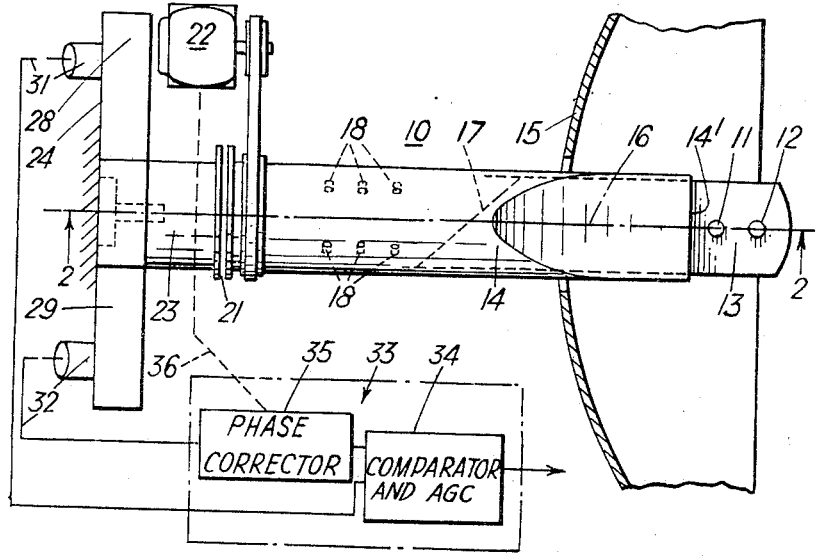

Jan. 13, 1970   D. W. ROBERTSON   3,490,020
AERIAL SYSTEMS
Filed Aug. 8, 1963

Inventor
D. W. ROBERTSON
By
Cameron, Kerkam & Sutton
Attorney

United States Patent Office 3,490,020
Patented Jan. 13, 1970

3,490,020
AERIAL SYSTEMS
David William Robertson, Prestbury, England, assignor to Ferranti Limited, Hollinwood, Lancashire, England, a company of Great Britain and Northern Ireland
Filed Aug. 8, 1963, Ser. No. 301,234
Claims priority, application Great Britain, Aug. 14, 1962, 31,227/62
Int. Cl. H04b 1/00
U.S. Cl. 343—100
4 Claims This invention relates to aerial systems for deriving a response dependent on the bearing of a received signal with respect to a reference axis of the system in a plane containing the signal direction and that axis, and a response dependent on the angle between that plane and a reference plane through the axis. The invention has particular application where the signal is a radar reflection from a target, and the responses are applied to the aerial system for tracking purposes so as to maintain the reference axis approximately aligned on the target.

It is known for such a system to include four aerial arrays with beams disposed symmetrically around the reference axis at equal angles to it. The outputs from the arrays are compared so as to derive signals proportional to the angular displacement, resolved into orthogonal planes, of the target from the reference axis. Such an arrangement has the disadvantage of requiring an extensive number of components and is therefore somewhat costly and generally occupies more space than can sometimes be spared, especially where the aerial system is airborne.

Another known system includes a single aerial array rotated so as to set up a conical scan around the reference axis. The output from the associated receiver is thus a sinusoid at the scan frequency of amplitude proportional to the extent of the angular displacement of the target from the reference axis, and a disadvantage of the arrangement accordingly is that random fluctuations of the signal, or even hostile jamming radiations which are amplitude modulated, are likely to be misinterpreted by the equipment as information about the target direction.

It is an object of the invention to provide an aerial system for the purpose stated that is of comparatively small bulk and cost and which is furthermore substantially free from the kind of error mentioned in the preceding paragraph.

In accordance with the present invention, an aerial system includes a rotatable stage having two waveguide channels, aerial-coupling arrangements for producing in those channels in response to a received signal two plane-polarised signals, each-to-each, the vector difference of which is dependent on the bearing of the received signal with respect to a reference axis of the system, a conversion stage for deriving sum and difference signals dependent on the vector sum and on the vector difference, respectively, of the two plane-polarised signals, driving means for rotating the rotatable stage about the reference axis with respect to a supporting structure, and response means for deriving from the sum and difference signals as the aerial stage is rotated a response dependent on the bearing of the received signal in the plane containing the direction of the reference axis and a response dependent on the angle between that plane and a datum plane containing that axis.

Figure 2:
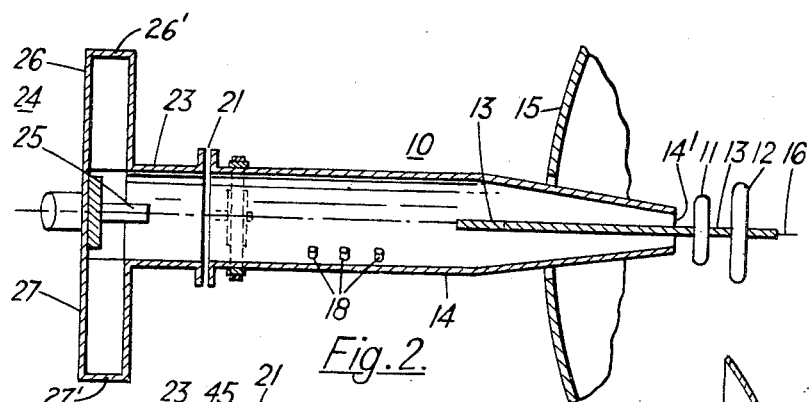
Figure 3:
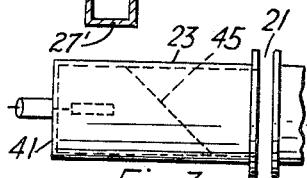
Figure 4:
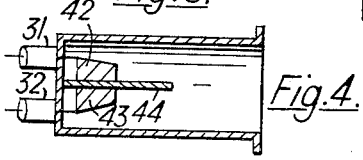
Figure 5:
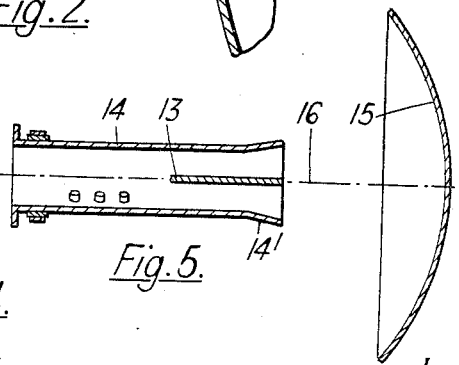

In the accompanying drawings,

FIGURE 1 is a simplified plan view of one embodiment of the invention, with a part shown in schematic form, FIGURE 2 is a section taken on the line 2—2 of FIGURE 1, FIGURES 3 and 4 show in plan and sectional elevation a part of the arrangement of FIGURES 1 and 2 modified in accordance with another embodiment, and FIGURE 5 is a sectional view similar to that of a part of FIGURE 2 but modified in accordance with another embodiment.

The invention will be described by way of example as applied to an airborne aerial tracking system for maintaining a reference axis of the system aligned on a target engaged by the craft which carries the aerial system. In carrying out the invention in accordance with this form, the aerial system includes a rotatable stage 10 having two parallel dipoles in the form of unipole pairs 11 and 12, see FIGURES 1 and 2, mounted on a conductive web 13 protruding on a diametral plane from the open end of a circular waveguide 14. The guide is tapered inwardly in the plane of the dipoles towards the open end $14^1$ and extends through a central aperture in a parabolic reflector or dish 15. The unipoles are situated at approximately the focus of the dish, pair 12 acting to reflect energy from the dish to the respective halves of the guide; the inward taper of the guide is to prevent the unipoles from being shielded by the guide from the dish. The dish itself is not rotatable, though it could be secured to stage 10 to rotate with it if preferred. The axis 16 of the dish coincides with the centre lines of the web and the guide and constitutes the reference axis of the system.

Web 13 extends along the guide 14, thereby dividing it into two semicircular halves. The effect of the conductive web extending outside the guide is to shield each half of the guide from half the dish, thereby causing each half of the guide to be excited (by way of the unipoles) by signals received from only that half of the dish which is on that side of the web.

In the region where the guide taper begins, web 13 is tapered off at 17 to cause this part of the guide to act as a conversion stage in the form of a hybrid coupler.

Protruding into the now undivided circular guide are six capacitive pins 18, three parallel to axis 16 at each end of a diametral plane of the guide; the inclination of this plane will be indicated later. This part of the guide constitutes a phase-shifter waveguide stage forming part of the response means.

Beyond the pins is a single rotary waveguide joint 21, provided in known manner with overlapping parts (not shown) acting as a choke to simulate electrical continuity.

The apparatus so far described and depicted on the right of the rotary joint (except the dish) is arranged to be rotated with respect to the supporting structure of the system (indicated by the diagonal hatching lines at the left end of FIG. 1) by driving means including a motor 22. The supporting structure carries the remainder of the response means, including the apparatus depicted on the left of the joint, which is now to be described.

The fixed part 23 of the circular guide 14 ends in a filter stage formed by a turnstile junction 24 having a matching post 25 and four rectangular arms or guides 26, 27, 28 and 29 extending perpendicularly to the axis of post 25 at intervals of 90° around that axis. The two opposite rectangular arms 26 and 27 of the junction are provided with short-circuiting terminations 26′ and 27′ at distances such as to cause the junction to act in known manner as a circular polariser. The other two rectangular guides 28 and 29 are conveniently coupled to coaxial lines 31 and 32 respectively, which form the output channels.

In a receiving stage 33, lines 31 and 32 are connected to an output stage in the form of a phase-sensitive amplitude comparator 34. As the rotary action of joint 21 introduces an error in the relative phase of the two signals of two cycles per revolution it is necessary to introduce a stage to correct this. This phase-correction stage 35 is connected between one of leads 31 and 32—lead 32, say—and the comparator and consists of a phase shifter operated by the motor (as indicated by the broken line 36) or otherwise in synchronism with it to set up a counteracting phase shift of opposite sense to the error shift at the joint. Stage 35 may conveniently be a suppressed-carrier single-sideband modulator energised by a modulation signal so controlled by the motor as to have twice the spin freqeuncy. Stage 33 includes arrangements (not shown) for developing an AGC or automatic gain control signal from the sum channel and applying it to both channels.

In operation, to maintain the reference axis 16 aligned on the target a microwave radar signal is transmitted in the target direction, either by apparatus independent of that described above, or by that apparatus in a manner to be indicated later. It is assumed to begin with that the motor 22 is not energised, so that rotatable stage 10 is not rotating.

So long as reference axis 16 is aligned on the target, the reflected signal, as passed by way of dish 15 and unipoles 11 and 12 into guide 14, is in the form of two parallel plane-polarised waves of $TE_{11}$ mode of like amplitude and phase, one in each waveguide channel formed by a semi-circular half of the guide. The hybrid coupler formed by the guide 14 and the tapering edge 17 of the dividing web 13 causes this part of the guide to convert the signals in the two halves of the guide into two orthogonal plane-polarised waves in the undivided waveguide channel formed by the part of the guide beyond the web, one wave representing the vector sum of the two signals and the other wave representing their vector difference. With a suitable design of the web taper this transformation may be effected without mismatch and with no coupling between the two modes in the undivided part of the guide.

The diametral plane of the capacitive pins 18 is arranged to be at 45° to the directions of the electric fields of both orthogonal waves and the pins are spaced apart and dimensioned to act as quarter-wave phase-shifters. The effect of the pins is accordingly to convert plane-polarised waves into circular-polarised waves of opposite hands—that is, with the field vectors of one wave rotating in the opposite direction to that of the vectors of the other wave. The reason for thus circular-polarising the waves is to allow the signals to pass the rotary joint 21 without undergoing mode or amplitude distortion.

Beyond the rotary joint the waves are re-converted by the turnstile junction 24 into plane-polarised waves, one in each of rectangular guides 28 and 29. The sum and difference signals thus reach receiver 33 in the form of coaxial-line signals which represent those values as amplitudes. In the present instance, where the aerial system is assumed to be aligned on the target, the signals in the two halves of guide 14 are alike in all respects, with the result that the difference signal is zero and the channel which carries that signal is accordingly unenergised. The response from receiver 33 is appropriate to that condition.

It is assumed now that there is a tracking error, the aerial system being no longer aligned on the target. Owing to the fact that each of the signals in the two halves of guide 14 is responsive to signals from only one half of the dish, the effect of the misalignment is to cause the two signals, whilst still of approximately equal amplitudes, to be displaced in phase with respect to one another in dependence on the extent of the error—that is, the extent of the angular displacement, resolved into the plane of the unipoles, of the target from the reference axis 16. The sense of the phase shift is dependent on the sign of the error—that is, the direction of the displacement in the unipole plane.

After conversion in the hydrid coupler at the tapered end 17 of the web, the resulting two orthogonal waves represent the extent of the tracking error by their relative amplitude and the sign of the error by their phase relation. The information is similarly represented by the circular-polarised waves and by the signals as presented to the receiving stage 33. In the amplitude comparator 34 of that stage there is derived an output indicative of the extent of the error; as the comparator is phase-sensitive the sign of this output represents the sign of the error.

The apparatus thus acts as a static-split receiver in the single plane of the unipoles.

When motor 22 is rotating stage 10, and hence rotating the single plane of the static-split, at a steady speed, the output from the phase-sensitive comparator 34 becomes a sinusoid having the scan frequency with an amplitude dependent on the extent of the error—that is, dependent on the bearing of the signal with respect to reference axis 16 in the plane containing signal and axis—and a phase with respect to a datum phase dependent on the angle between that plane and a datum plane containing that axis. The error introduced at the rotary joint in the relative phase of the two output signals applied to the comparator 34 is corrected by stage 35 as described above. Thus the output from the comparator is the same as that from a conical-scan receiver of the known kind above referred to; but in the system in accordance with the invention any random variations in the signal strength will affect both signals similarly. Hence such fluctuation will only be proportional to any error in amplitude equality already present, and will be reduced by the AGC (which, as already stated, is derived from the sum channel) without giving rise to the errors experienced in the known form of conical scanner. The output from the comparator may be made use of, either to indicate misalignment or to correct for it, as in a known conical-scan receiver.

A further advantage of the invention is reduction in bulk achieved by the use of a single waveguide rotary joint, carrying two circularly-polarised signals distinguished by being of opposite hands, in comparison with a rotary joint of the kind in which two signals are carried by separate coaxial channels.

It is not necessary for guide 14 to be circular throughout its length, for except in the vicinity of the rotary joint the guide may be square in cross section, with the phase-shifter pins located across one diagonal and with web 13 dividing the guide into two rectangular guides. This alternative may be the easier to manufacture.

Instead of using a turnstile filter to separate the two hands of circular polarisation into the coaxial lines, a filter in the form of a hybrid coupler of the kind formed by the tapered end of web 13 may again be employed. In such an arrangement—see FIGURE 3 and 4—the fixed part 23 of guide 14 is closed at the end 41 remote from the rotary joint 21. The two coaxial lines 31 and 32 are introduced through this end, their outer conductors being connected to the guide. The inner conductors are connected by coupling members 42 and 43 respectively to the respective faces of a central conductive web 44 which bisects this end of the guide. Web 44 is tapered at 45, that is, at the end of it nearer joint 21.

The operation of this coupler may best be understood by assuming that energy is being fed the other way—from the coaxial lines to the guide. In each line the signal matches to the one half-round guide to which that line is connected. The hybrid action of the tapered web divides the signal equally between plane modes in the round guide which are polarised normal and parallel to the plane of the web. Suitable design of the taper of web 44 ensures a quarter-wave phase difference between the modes. Reciprocally, therefore, the two hands of circular polarisation which reach this end of guide 14 from joint 21 couple independently into the two coaxial lines. By using this form of filter a very compact structure may be arrived at.

The vector difference of the signals in the two halves of guide 14 which represents the required directional information need not necessarily be a phase difference. By removing that part of web 13 which in the arrangement of FIG. 1 protrudes outside guide 14, and removing with it the unipoles, and placing the dish 15 so that the open end of guide 14 looks into it, as shown in FIG. 5, the aerial-coupling arrangements become such that each half of the guide becomes energised by signals received from the whole of the dish. As there are no unipoles which might be obstructed by the open end of guide 14, that end need not be tapered inwardly, as in the arrangement of FIG. 1, but may be tapered slightly outwardly, as shown at 14$^1$ in FIG. 5. The result is that the vector difference which represents the information is the amplitude difference, rather than the phase difference. From these signals the hybrid coupler derives the two orthogonal plane-polarised signals as already described, the rest of the equipment and its manner of operation being as before except for the obvious necessity of either adjusting the comparator 34 or including a 90° phase shift stage in one of its inputs.

In the last-described embodiment the signals received by the dish may to some extent be masked by the apparatus depicted on the left of the dish in FIG. 1, it may therefore be preferable to replace the dish by some sort of electronic lens, acting to converge into the open end of guide 14 signals coming from the opposite direction. The guide need not then be tapered inwardly towards its open end.

Any of the above-described embodiment may also be used as the transmitter of the radar signal. This may be effected by connecting the feeder of the aerial sum channel by way of a duplexer of known type to the receiver sum channel and a transmitter stage.

An aerial system in accordance with the invention need not necessarily be used for tracking purposes; it may for example be used for obtaining from the outputs of the receiver a mere measurement or indication of the bearing of the target in the signal plane and the inclination of that plane to the datum plane.

What I claim is:

1. An aerial system including a rotatable stage having two waveguide channels, aerial-coupling arrangements for producing in those channels in response to a received signal two plane-polarised signals, each-to-each, the vector difference of which is dependent on the bearing of the received signal with respect to a reference axis of the system, a conversion stage for deriving in a single waveguide channel in the rotatable stage sum and difference signals dependent on the vector sum and on the vector difference, respectively, of the two plane-polarised signals, driving means for rotating the rotatable stage about the reference axis with respect to a supporting structure, and response means for deriving from the sum and difference signals as the aerial stage is rotated a response dependent on the bearing of the received signal in the plane containing the direction of the signal and the reference axis and a response dependent on the angle between that plane and a datum plane containing that axis.

2. A system as claimed in claim 1 wherein the conversion stage includes a hybrid coupler for deriving the sum and difference signals in the form of two orthogonal plane-polarised signals, the response means including a phase-shifter waveguide stage in the rotatable stage for converting the two orthogonal signals into two circularly-polarized signals of opposite hands and a single rotary waveguide joint for coupling the circularly-polarised signals to part of the response means on the supporting structure.

3. A system as claimed in claim 2 wherein the part of the response means on the supporting structure includes a filter stage arranged to separate the circularly-polarised signals from one another into two output channels, each to each, as signals in other than circularly-polarised form, a phase-correction stage synchronised to the driving means for correcting the relative phase of the signals in the output channels for the phase shift imparted in operation to the circularly-polarised signals at the rotary joint, and a phase-sensitive amplitude comparator stage for deriving said responses in dependence on the relative amplitude and corrected relative phase, respectively, of the signals in the output channels.

4. A system as claimed in claim 3 wherein the filter stage is formed by a portion of waveguide coupled at one end to the rotary joint, the other end being short-circuited and being bisected by a conductive web tapered at the end nearer the joint, the two channels being coupled to the two halves, each to each, of this portion of waveguide separated by the web.

References Cited

UNITED STATES PATENTS

| 3,089,137 | 5/1963 | Pierce | 343—756 |
| 3,164,831 | 1/1965 | Mraz | 343—16.1 |
| 2,730,710 | 1/1956 | Loeb | 343—16.1 |

RODNEY D. BENNETT, JR., Primary Examiner

JEFFREY P. MORRIS, Assistant Examiner